United States Patent
Neal

(10) Patent No.: US 10,442,970 B2
(45) Date of Patent: Oct. 15, 2019

(54) ICE MELTING COMPOSITION AND PROCESS FOR PRODUCING THEREOF

(71) Applicant: 9533109 Canada Inc., St Marys (CA)

(72) Inventor: Peter Burley Neal, St. Marys (CA)

(73) Assignee: 9533109 Canada Inc., St Marys (CA)

( * ) Notice: Subject to any disclaimer, the term of this patent is extended or adjusted under 35 U.S.C. 154(b) by 14 days.

(21) Appl. No.: 15/898,298

(22) Filed: Feb. 16, 2018

(65) Prior Publication Data

US 2018/0230350 A1 Aug. 16, 2018

Related U.S. Application Data

(60) Provisional application No. 62/459,997, filed on Feb. 16, 2017.

(51) Int. Cl.
| | | |
|---|---|---|
| *C09K 5/06* | (2006.01) | |
| *C09K 3/18* | (2006.01) | |
| *C01D 3/22* | (2006.01) | |

(52) U.S. Cl.
CPC ................ *C09K 5/066* (2013.01); *C01D 3/22* (2013.01); *C09K 3/185* (2013.01); *C01P 2004/01* (2013.01); *C01P 2004/60* (2013.01); *C01P 2006/20* (2013.01); *C01P 2006/82* (2013.01)

(58) Field of Classification Search
CPC .......... C09K 3/185; C09K 5/066; C01D 3/22; C01P 2004/01; C01P 2004/60; C01P 2006/20; C01P 2006/82
See application file for complete search history.

(56) References Cited

U.S. PATENT DOCUMENTS

| | | | | |
|---|---|---|---|---|
| 3,906,140 A | * | 9/1975 | Capes ........................ | B01J 2/28 252/70 |
| 6,562,256 B1 | * | 5/2003 | Fleming ................... | C09K 3/18 106/13 |
| 8,182,714 B2 | * | 5/2012 | Ossian ................... | C09K 3/185 106/13 |
| 8,262,926 B2 | * | 9/2012 | Kassouni ............... | C09K 3/185 106/13 |
| 9,458,368 B2 | | 10/2016 | Matuszczak et al. | |
| 2004/0021127 A1 | * | 2/2004 | Koefod .................. | C09K 3/185 252/70 |

FOREIGN PATENT DOCUMENTS

| | | | |
|---|---|---|---|
| CA | 2640852 | 6/2009 | |
| CA | 2774430 | 12/2012 | |
| CN | 102408872 A | 4/2012 | |
| CN | 105112018 A | 12/2015 | |
| DE | 2127679 | 12/1972 | |
| DE | 2127680 | 12/1972 | |
| DE | 4129073 | 3/1993 | |
| WO | WO-9913018 A1 * | 3/1999 | ............. C09K 3/185 |

OTHER PUBLICATIONS

Office Action dated Feb. 23, 2018 on Canadian Patent Application CA 2,988,744.
Peter Taylor, John Verkade, Kasthurirangan Gopalakrishnan, Kuldeep Wadhwa, and Sunghwan Kim, Development of an Improved Agricultural-Based Deicing Product, National Concrete Pavement Technology Center, Final Report, Jan. 2010, Iowa, USA.

\* cited by examiner

*Primary Examiner* — Anthony J Green
(74) *Attorney, Agent, or Firm* — Brunet & Co., Ltd.

(57) ABSTRACT

A solid ice melting composition is composed of pelletized salt, the pelletized salt having a plurality of salt particles pressed together, inter-particle spaces between the salt particles inside the pelletized salt, and a deicing liquid in the inter-particle spaces. The composition is produced by pelletizing a plurality of salt particles to form pelletized salt, and introducing deicing liquid into inter-particles spaces between the salt particles in the pelletized salt by infusing the deicing liquid into the pelletized salt. The solid ice melting composition is easy to handle and spread, is longer lasting and is effective at temperatures down to about −30° C. or lower.

19 Claims, 1 Drawing Sheet

ICE MELTING COMPOSITION AND PROCESS FOR PRODUCING THEREOF

CROSS-REFERENCE TO RELATED APPLICATIONS

This application claims the benefit of U.S. Provisional Application Ser. No. 62/459,997 filed Feb. 16, 2017, the entire contents of which is herein incorporated by reference.

FIELD

This application relates to compositions for melting ice and processes for producing such ice melting compositions.

BACKGROUND

In cold climates, the formation of ice on surfaces such as roadways, sidewalks and the like is a significant hazard to motorists and pedestrians. To prevent the formation of ice, or to melt ice that has already formed, it is common practice to spread a deicing composition on the surface. Deicing composition generally work by lowering the freezing point of water to below the ambient air temperature. Therefore, efforts are generally directed to developing compositions that lower the freezing point of water to a greater extent and/or are active over longer periods of time. There have been a wide variety of such compositions developed in the past, many of which are based on some combination of glycerol (also known as glycerin) and a salt, for example sodium chloride or calcium chloride, (see, for example, CA 2,640,852, DE 2127680, DE 2127679, CA 2,774,430, U.S. Pat. Nos. 8,182,714, 9,458,368 and DE 4,129,073).

While progress has been made, existing compositions comprising glycerol and a salt generally lack sufficient flowability making them more difficult to handle and spread on a surface. Such existing compositions are typically prepared by blending salt and glycerol in a mixer, thereby coating the surface of salt particles with glycerol, resulting in a material that becomes difficult to handle, especially when higher amounts of glycerol are used. Further, these compositions, as well as simple deicing compositions based solely on particulate salts, are not long lasting due to too rapid dissolution in the water the compositions create when melting the ice, thereby requiring frequent re-application of the deicing composition to the surface. Finally, many deicing compositions generally do not provide ice melting ability at very low temperatures.

A need remains for a deicing composition that is readily spreadable, longer lasting and/or is effective at very low temperatures.

SUMMARY

In one aspect, there is provided a process for producing a solid ice melting composition, the process comprising: pelletizing a plurality of salt particles to form pelletized salt; and, introducing a deicing liquid into inter-particles spaces between the salt particles in the pelletized salt by infusing the deicing liquid into the pelletized salt.

In another aspect, there is provided a solid ice melting composition produced by the process.

In another aspect, there is provided a solid ice melting composition comprising pelletized salt, the pelletized salt comprising: a plurality of salt particles pressed together; inter-particle spaces between the salt particles inside the pelletized salt; and, a deicing liquid in the inter-particle spaces.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1B:
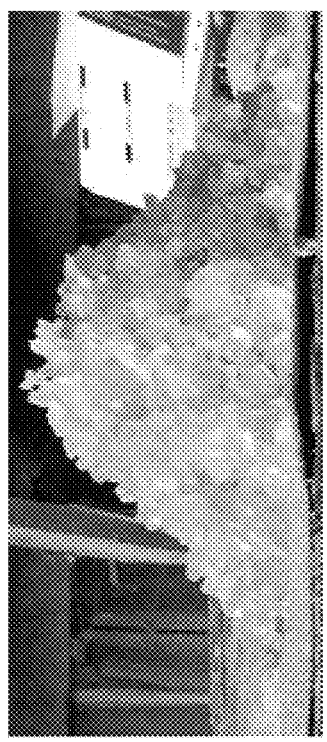
FIG. 1A is a photograph of a pile of a solid ice melting composition produced by pelletizing salt particles and infusing the pellets with glycerol; and, FIG. 1B is a photograph, at the same scale as the photograph of FIG. 1A, of a pile of a commercial deicer produced by blending unpelletized salt particles with glycerol.

A solid ice melting composition that is more readily spreadable (e.g. having improved particle flow characteristics), is longer lasting (e.g. up to about 4 days) and/or is effective at very low temperatures (e.g. down to about −30° C. or lower) may be produced by pelletizing a plurality of salt particles to form pelletized salt, and introducing a deicing liquid into inter-particles spaces between the salt particles in the pelletized salt by infusing the deicing liquid into the pelletized salt.

Salt particles may be solid particles of any salt compound useful for anti-icing/deicing applications. The salt may be an organic compound, an inorganic compound or a mixture thereof. Inorganic salts are preferred. Inorganic salts include, for example, chloride or acetates salts of Group I or Group II metals. Group I or Group II metals include, for example, sodium, potassium, calcium and magnesium. Chloride salts are preferred. Particularly preferred salts are sodium chloride, potassium chloride, magnesium chloride, calcium chloride or mixtures thereof. Sodium chloride, calcium chloride or mixtures thereof are most preferred. The salt may be obtained from any convenient source. For example, a salt comprising sodium chloride, together with smaller amounts of calcium chloride and magnesium chloride, may be obtained as a waste byproduct from evaporating a mixed chloride brine.

The salt particles to be pelletized are of suitably small size so that once pelletized, the pelletized salt comprises a plurality of the salt particles formed into a larger, homogeneous mass having inter-particles spaces between the salt particles in the pelletized salt. The salt particles are preferably micron-sized, having an average particle size along a longest dimension in a range of less than about 1000 µm. Preferably, the salt particles have an average particle size along a longest dimension in a range of about 50 µm to about 750 µm, or about 100 µm to about 500 µm. The salt particles may be crystalline.

The salt particles preferably have a moisture content of about 0.1 wt % or less, more preferably about 0.05 wt % or less. Reducing moisture content of the salt particles before pelletizing advantageously promotes the production of a final ice melting composition with better flow characteristics making the composition more readily spreadable. It has been found that salt particles having a moisture content of about 0.1 wt % or less are particularly advantageous in this regard. If desired or required, the salt particles may be heated to dry the salt particles prior to pelletizing the salt particles. The salt particles may be heated to any suitable temperature, preferably to a temperature in a range of about 50° C. to about 100° C., more preferably about 60° C. to about 80° C., for example about 77° C. The salt particles may be kept warm enough before pelletizing to prevent or reduce absorption of moisture.

The deicing liquid may be any liquid suitable for use in anti-icing/deicing applications. Some examples of deicing liquids include glycerol, ethylene glycol, propylene glycol or mixtures thereof. Glycerol is preferred. Of note is glycerol derived from biodiesel manufacturing from a vegetable oil. Further, glycerol derived from biodiesel manufacturing from canola oil is particularly advantageous in comparison to glycerol derived from biodiesel manufacturing from other vegetable oils (e.g. corn, soy). The use of glycerol derived from biodiesel manufacturing from other vegetable oils may result in a composition that has an unpleasant odor and/or a dark, muddy color, which is not the case for glycerol derived from canola oil. Further, glycerol having a purity of about 80% or greater with a moisture content of about 10% or less, provides substantial benefits to the performance of the ice melting composition. The glycerol even more preferably has a moisture content of about 8% or less. Using purer glycerol and reducing moisture content of the glycerol advantageously promotes the production of a final ice melting composition with better flow characteristics making the composition more readily spreadable. Reducing moisture content of the glycerol also helps prevent dissolution of the salt particles into the glycerol in the pelletized salt. Dissolution of the salt particles in the glycerol would compromise the solidity of the pelletized salt as well as the length of the time over which the composition would be effective.

The amount of deicing liquid in the ice melting composition is preferably in a range of about 0.1 wt % to about 10 wt %, based on weight of the salt. Preferably, the amount of deicing liquid is in a range of about 1 wt % to about 5 wt %. The deicing liquid occupies the inter-particles spaces between the salt particles in the pelletized salt. The inter-particle spaces may have an average size along their longest dimensions in a range of about 5 μm to about 300 μm. The solid pelletized salt is larger in size than the salt particles therein. The pelletized salt may have an average size along a longest dimension in a range of about 1 mm or more, preferably about 1 mm to about 10 mm, or about 2 mm to about 7 mm.

The ice melting composition is effective at melting ice at temperatures down to about −28° C. or lower, or even down to about −30° C. or lower.

The ice melting composition is a solid. The solid has bulk physical properties that contribute to the solid's suitability for spreading as an ice melting composition. The ice melting composition preferably has an angle of repose in a range of about 20° to about 45°, more preferably about 25° to about 40°.

Pelletizing the salt particles may be performed in a pelletizing machine, for example a pellet mill (also known as a pellet press), which creates pellets from the salt particles by combining the salt particles into a larger, homogeneous mass. Various kinds of pellet mills are suitable, for example flat die mills and ring die mills. Flat die mills use a flat die with slots. The salt particles may be introduced to a top of the die. As the die rotates a roller presses the particles through the holes in the die. A cutter on the other side of the die cuts the exposed pellet free from the die. A ring die comprises radial slots throughout the die. The salt particles may be fed into the inside of the die and spreaders evenly distribute the particles. Two rollers then compress the salt particles through the die holes. Two cutters are used to cut the pellets free from the outside of the die.

After the pellets are formed, the pelletized salt is infused with the deicing liquid so that the deicing liquid occupies the inter-particle spaces between the salt particles. The infusing is preferably performed by contacting the pelletized salt with the deicing liquid under sufficient pressure to encourage the deicing liquid to move through pores in the pelletized salt into the interparticle spaces between salt particles in the pelletized salt. More preferably, the infusing is performed by spraying the deicing liquid under pressure on to the pelletized salt. Suitable pressures may vary depending on the nature of the pelletized salt. The pressure is preferably in a range of about 150 kPa to about 400 kPa, more preferably about 200 kPa to about 325 kPa, for example about 275 kPa. Spraying atomizes the deicing liquid into fine droplets thereby enhancing the ability of the pelletized salt to absorb the deicing liquid. Additionally, the pelletized salt may be warm during the infusion process to further encourage absorption of the deicing liquid. The heat required to keep the pelletized salt warm may be residual heat from drying the salt particles before pelletizing, or the pelletized salt may be actively heated while being infused with the deicing liquid, or both residual heat and active heating may be employed. During infusion, the pelletized salt is preferably at a temperature in a range of about 40° C. to about 100° C., more preferably about 60° C. to about 80° C., for example about 70° C.

In this way, the deicing liquid does not just coat the surface of the pelletized salt, but is substantially uniformly distributed throughout the pelletized salt. Distributing the deicing liquid substantially uniformly within the pelletized salt in the interparticle spaces advantageously permits using a greater proportion of deicing liquid to salt without adversely affecting the solidity and spreadability of the ice melting composition, while resulting in a longer lasting and more effective ice melting composition even at very low temperatures. It has been found that by providing deicing liquid throughout the pelletized salt, the deicing liquid is slowly released as the pelletized salt melts. By providing deicing liquid with a low water content, the pellet maintains physical cohesion and is allowed to melt ice at a much lower temperature. In the prior art where deicing liquid is simply coated on to salt particles, the deicing liquid quickly leaches away from the salt leaving a "puddle" of deicing liquid around a melting salt crystal, which provides short term and less effective ice melting performance.

To further assist with infusion of the deicing liquid into the pelletized salt, the pelletized salt may be subjected to agitation during the infusion process. The agitation may be accomplished, for example, by introducing the pelletized salt into a revolving chamber. As the chamber revolves, the pelletized salt tumbles and is more thoroughly contacted with the deicing liquid while the deicing liquid is being sprayed on to the pelletized salt.

The pelletizing machine may create pellets having regular sizes and shapes or pellets having irregular sizes and shapes. If desired, the pellets may be broken into pieces (e.g. pulverized) before, during or after the deicing liquid is infused. The term 'pelletized salt' may refer to the pellets or to pieces of the pellets. The pellets may be first infused with the deicing liquid, and then the infused pellets may be broken into pieces, for example by exposing the infused pellets to a hammer mill or roller mill. However, breaking the pellets into smaller pieces is generally not as desirable because dust formed during the breaking process may have an undesirable effect on the efficacy of the ice melting composition. Preferably, the pelletized salt comprises irregularly sized and shaped pellets formed 'as is' from the pelletizing machine without subsequent pulverization. Prior to infusing the pelletized salt with the deicing liquid, and after the salt particles are pelletized, the pelletized salt may be passed through a dust collector to remove airborne dust and other loose small particles that may be present.

The ice melting composition may further comprise auxiliaries. For example, a dye, an antimicrobial agent, a corrosion inhibitor and the like, or any mixture thereof. A dye (e.g. a water-soluble green, blue or purple dye) is particularly useful when the salt and the deicing liquid are white or colorless, which is usually the case. Adding a dye helps contrast the ice melting composition from snow during spreading to help distinguish areas where the ice melting composition has been spread from where areas that have not received the composition. An antimicrobial agent (e.g. hydrogen peroxide) inhibits the growth of bacteria and other microorganisms in the composition. Because the salt can be corrosive to metal and concrete surfaces, a corrosion inhibitor (for example, an organophosphorus compound (e.g. organophosphate), an organonitrogen compound (e.g. organic amine), a fatty acid-based compound or salts thereof or mixtures thereof) can protect such surfaces from degradation. The auxiliaries may be present in the composition in sufficient amounts to perform their respective functions. The dye may be suitably present in the composition in an amount of about 0.001 wt % to about 0.01 wt %, based on weight of the salt. The antimicrobial agent may be suitably present in the composition in an amount of about 0.001 wt % to about 0.01 wt %, based on weight of the salt. The corrosion inhibitor may be suitably present in the composition in an amount of about 0.1 wt % to about 1 wt %, based on weight of the salt. Liquid auxiliaries may be introduced along with the deicing liquid, while solid auxiliaries may be blended with the salt particles prior to pelletizing.

During pelletizing, individual salt particles are fused together under pressure, and possibly at elevated temperature, to form contact interfaces between salt particles, the salt particles adhering to each other at the contact interfaces with sufficient force to hold the salt particles in a pellet. Although a pellet itself is single solid entity, the pellet comprises therein individual salt particles and inter-particles spaces between the salt particles substantially uniformly distributed within the pellet. Even if the pellet is broken into pieces, the pieces also comprise individual salt particles therein and inter-particles spaces between the salt particles substantially uniformly distributed within the piece.

EXAMPLES

Materials:

Salt particles were obtained from Western Salt Co. (Courtright, Ontario) as a finely powdered crystalline waste byproduct produced from evaporating a mixed chloride brine. The salt particles have an average particle diameter of about 300 μm and a moisture content of about 1 wt %.

Glycerol was obtained from Atlantic Biodiesel Corporation (Welland, Ontario) and is derived from the manufacturing of biodiesel from canola oil. The glycerol is food grade and has a purity of 81.1 wt %, with a moisture content of 7.8 wt %, an ash content of 7.6 wt % and a MONG content of 3.5 wt % (MONG is matter organic non-glycerol).

Hydrogen peroxide is 5% USP from NDC, Inc. (Lavergne, Tex.).

Corrosion inhibitor is aminoethylphosphonic acid based.

Green dye is liquid Pylakor™ Bright Green LX-11963 dye from Pylam Products Company, Inc. (Tempe, Ariz.).

The pelletizer is a Ludman flat plate die model having a plate width of 12" and a plate thickness of 0.5". The die exerts a pressure of about 22 MPa (about 3200 psi) on the salt to form the pellet. This pelletizer directly creates irregularly shaped and sized pellets in three general size ranges. Pellets having a middle size range (about 1-10 mm) were used to produce the ice melting composition.

Producing the Ice Melting Composition

In a process line, 1000 kg of salt particles are loaded by a loader into a hopper, which feeds a gas-fired dryer where the salt particles are heated to 77° C. to dry the salt particles to a moisture content of about 0.05 wt %. Automatic dust collection is performed during the drying process. From the dryer, the dried salt particles are carried on a conveyor to a pelletizer. In the pelletizer, still warm pellets are formed by compression of the salt particles through an extrusion die using two steel rollers designed to produce pellets of irregular size and shape. From the pelletizer, pellets having a size in a range of about 1-10 mm are then transported by a conveyor through a dust collection chamber to further remove any airborne dust and small particles present on the pellets. The pellets are then transported into a 6-foot long revolving drum where a mixture of 19 L of glycerol, 6 L of corrosion inhibitor, 0.75 L of hydrogen peroxide and 40 mL of green dye are applied to the tumbling pellets at a temperature of 71° C. and a pressure of 275 kPa (40 psi) by fan spray nozzles directed into the revolving drum. Residence time of the pellets in the drum is about 10 seconds before the pellets, having absorbed the sprayed liquids therein, drop to a rubber conveyor belt and carried to a cooling station. After cooling for about 24 hours, the pellets are packaged for delivery as a solid ice melting composition.

Characterizing the Ice Melting Composition

The ice melting composition is bright green in color, dry to the touch and has little to no odor.

Figure 1A:

With reference to FIG. 1A and FIG. 1B, it is evident that the solid ice melting composition produced by pelletizing salt particles and infusing the pellets with glycerol (FIG. 1A) has a lower angle of repose than a similar pile of commercial solid deicer produced by simply blending salt particles with glycerol (FIG. 1B). The angle of repose of the material in FIG. 1A is considerably less than 45° while the angle of repose of the commercial deicer is considerably more than 45°. The large angle of repose for the commercial deicer (FIG. 1B) indicates a sticky material with poorer flowability making the material more difficult to handle and spread. In contrast, the lower angle of repose for the solid ice melting composition shown in FIG. 1A indicates greater flowability and greater ease of handling and spreading.

Testing the Ice Melting Composition

The solid ice melting composition produced in accordance with the procedure described above was tested for ice melting performance in comparison to commercially available deicers in accordance with the following procedure.

1. For each test, nine samples of 150 ml of ground water were placed in 10" round plastics containers.
2. For each product sample (I1, C1, and C2), three 10 gram samples of each were placed in clean glass sample bottles.

3. The nine water samples and the nine product samples (three for each product) were placed into a walk-in thermal chamber at the test starting temperature and left to acclimate for 24 hours.
4. The water samples, having frozen into ice sample, and the product samples were divided into three groups, one group for each temperature in the test, with each group containing one of the three different product samples.
5. Each of the three product samples from the first group were placed individually onto the three ice samples and left to sit for one hour.
6. Observations were made for each of the three samples.
7. The chamber was set to the next test temperature and left to acclimate for a minimum of 1.5 hours.
8. Steps 5-7 were repeated for the second and third sample groups.
9. Steps 1-8 were repeated for the second test.

Table 1 provides results, where:
Sample I1 is the solid ice melting composition produced in accordance with the procedure described above;
Sample C1 is a heavy calcium-based deicer containing no glycerol; and,
Sample C2 is natural salt coated with glycerol by blending.

TABLE 1

| Sample | Test 1: −24° C. to −32° C. | | | Test 2: −32° C. to −24° C. | | |
|---|---|---|---|---|---|---|
| | −24° C. | −28° C. | −32° C. | −32° C. | −28° C. | −24° C. |
| I1 | Ice melted | Ice melted | 100% sticking | 100% sticking | Ice melted | Ice melted |
| C1 | Ice melted | Ice melted | Ice melted | Ice melted | Ice melted | Ice melted |
| C2 | 50% sticking | 25% sticking | 0% sticking | 75% sticking | 100% sticking | Ice melted |

Sample I1 demonstrated complete ice melting capability down to a temperature of −28° C., i.e. the ice melted into water in that temperature range. That 100% of the Sample I1 stuck to the ice at −32° C. demonstrates some capability to melt ice at temperatures as low as −32° C. In contrast, comparative Sample C2, which is natural salt blended with glycerol, demonstrated very little ability to fully melt ice at temperatures below −24° C.

Further, in-practice observations demonstrated separation and pooling of the glycerol for Sample C1, and a lack of effectiveness by the end of a few days for both Sample C1 and Sample C2, while the ice melting composition based on Sample I1 remained effective over a period of about 4 days.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A process for producing a solid ice melting composition, the process comprising:
   pelletizing a plurality of salt particles by compressing the salt particles together to fuse the salt particles together under pressure to form pelletized salt; and,
   introducing a deicing liquid into inter-particles spaces between the salt particles in the pelletized salt by infusing the deicing liquid into the pelletized salt.
2. The process of claim 1, wherein the infusing is performed at a temperature in a range of about 40° C. to about 100° C.
3. The process of claim 1, wherein the infusing is performed at a temperature in a range of about 60° C. to about 80° C.
4. The process of claim 1, wherein the infusing is performed by spraying the deicing liquid under pressure on to the pelletized salt.
5. The process of claim 4, wherein the deicing liquid is sprayed at a pressure in a range of about 150 kPa to about 400 kPa.
6. The process of claim 5, wherein the pelletized salt is agitated in a revolving drum while the deicing liquid is sprayed on the pelletized salt.
7. The process of claim 1, further comprising drying the plurality of salt particles at a temperature in a range of about 50° C. to about 100° C. prior to the pelletizing.
8. The process of claim 1, wherein the salt particles have a moisture content of about 0.1 wt % or less when the salt particles are pelletized.
9. The process of claim 1, wherein the deicing liquid comprises glycerol and the salt particles comprise sodium chloride, calcium chloride or a mixture thereof.
10. The process of claim 9, wherein the glycerol is derived from biodiesel manufacturing from canola oil, has a purity of about 80% or greater and has a moisture content of about 10% or less.
11. A solid ice melting composition comprising pelletized salt, the pelletized salt comprising:
   a plurality of salt particles pressed together under pressure to fuse the salt particles together;
   inter-particle spaces between the salt particles inside the pelletized salt; and,
   deicing liquid in the inter-particle spaces.
12. The composition of claim 11, wherein the deicing liquid is substantially uniformly distributed in the pelletized salt.
13. The composition of claim 11, wherein the deicing liquid comprises glycerol.
14. The composition of claim 13, wherein the glycerol is derived from biodiesel manufacturing from canola oil, has a purity of about 80% or greater and has a moisture content of about 10% or less.
15. The composition of claim 11, wherein the salt particles in the plurality of salt particles have an average particle size along a longest dimension in a range of about 100 μm to about 500 μm.
16. The composition of claim 11, wherein the pelletized salt has an average size along a longest dimension in a range of about 1 mm to about 10 mm.
17. The composition of claim 11, wherein the salt comprises sodium chloride, calcium chloride or a mixture thereof.
18. The composition of claim 11, further comprising a dye, an antimicrobial agent, a corrosion inhibitor or any mixture thereof.
19. The composition of claim 11, wherein the pelletized salt has an angle of repose in a range of about 20° to about 45°.

* * * * *